INVENTOR.
ROBERT N. GOLDMAN
BY
Nilsson, Robbins & Anderson
ATTORNEYS

INVENTOR.
ROBERT N. GOLDMAN
BY
Wilson, Robbins & Anderson
ATTORNEYS

INVENTOR.
ROBERT N. GOLDMAN
BY
Nilsson, Robbins & Anderson
ATTORNEYS

United States Patent Office 3,345,612
Patented Oct. 3, 1967

3,345,612
DATA RECOVERY SYSTEM WHEREIN THE DATA FILE AND INQUIRIES ARE IN A PREARRANGED ORDER

Robert N. Goldman, Los Angeles, Calif., assignor to Telecredit, Incorporated, a corporation of California
Filed July 20, 1964, Ser. No. 383,795
6 Claims. (Cl. 340—172.5)

ABSTRACT OF THE DISCLOSURE

A data-filing apparatus including a serial recording medium for containing a vast number of individual entries that may be specified for production by randomly-occurring inquiries that are reduced to electrical signals. The entries are recorded on the serial recording medium in a predetermined order of significance and the medium is scanned for serial production of the entries in the predetermined order from low to high. A cyclic magnetic-drum memory records the signal-represented inquiries in the predetermined order, as they are received. A control system maintains the proper predetermined order of the inquiries on the magnetic-drum memory and furthermore designates the storage location on the drum from which the next inquiry is taken for processing, which inquiry is the lowest order above the order of the current entry under consideration from the serial recording medium in the predetermined order. This system also incorporates structure for limiting the number of entries produced in response to an inquiry.

The present invention relates to a data processing system and particularly to a system wherein a large quantity of data is stored to be selectively manifested when desired. Still more particularly, the present invention may be applied to systematize various information-retrieval projects, for example, to establish a credit agency for reporting the status of individual subjects upon whom an inquiry is submitted.

Various types of information retrieval systems have been previously proposed. In general, a random-access memory in such systems provides all data immediately available. However, large, random-access memories are exceedingly expensive and therefore, are often not in large-volume data-retrieval systems. Therefore, data-retrieval systems which handle a large volume of data conventionally employ a serial memory or storage capacity. For example, magnetic-tape storage is economical and widely used for data-retrieval systems with high volume capabilities.

In using magnetic-tape storage, considerable delay may be experienced, waiting for the section of tape bearing the selected data to be placed in a location in which it can be sensed. For example, a desired quantity of information may be recorded on magnetic tape which is buried under several hundred feed of the tape on a spool. In such an instance, considerable time may pass while the reel moves tape, to reach the desired information. Therefore, the need exists for a data-retrieval system which is efficient of time in obtaining information from a serial memory or data storage apparatus.

Although various prior data-retrieval systems have been developed and used, such systems have been applied to rather-limited fields. For example, the present invention contemplates systematizing a credit agency, which in the past has not been practicably possible to the best knowledge of the present inventor.

In accordance with conventional business operations, a vast quantity of purchases and other transactions are made on credit. Normally these purchases are either made on the basis of a reoccurring charge account under which the credit risk of the purchases is fairly well established, or on the basis of a credit report. Many transactions based on a credit report are consummated before an extensive investigation can be conducted. However, almost invariably a routine check is made with a local credit agency. The credit agencies usually obtain records from local newspapers and legal periodicals, for the names of people who are bankrupt, who have been subject of a judgment, or other legal action and who have been declared incompetent. Credit agencies may also obtain information from merchants and other sources to supplement their files of bad credit risks.

In operation, the credit agency normally has a voluminous card file which is alphabetically arranged and which contains pertinent data on a large number of people who are questionable credit risks. On call from a subscribing merchant, a clerk in the credit agency consults the file, determines whether or not the subject of inquiry is listed, and if he is, provides the entered data to the merchant.

It is readily apparent that the data contained in the card file of a credit agency could be recorded on magnetic tape; however, it is also apparent that the time required to locate information to answer each inquiry would render the entire operation uneconomical. For example, an inquiry in the A group might be followed by one in the T group, and so on, with the result that the tape would move a great distance between the average inquiries. Of course if a random-access form of storage were employed to avoid this difficulty the cost would be very great.

In general, an object of the present invention is to provide an automated data-retrieval system which may be used to systematize a credit agency.

Another object of the present invention is to provide an improved data-retrieval system incorporating a serial storage apparatus which is economical of time in selecting particular sections of recorded data.

Still another object of the present invention is to provide an improved data-retrieval system wherein a large volume of data is registered, and selected portions of the data may be provided in a reasonable time.

A further object of the present invention is to provide a data-retrieval system wherein a serial storage apparatus contains considerable data arranged in a predetermined order, and wherein a second storage apparatus receives and registers inquiries in the same prearranged order whereby the data inquired for is supplied efficiently and economically.

These and other objects of the present invention will become apparent to one skilled in the art from a consideration of the following, taken in conjunction with the figures, wherein.

Figures 1, 2, 3, 4:
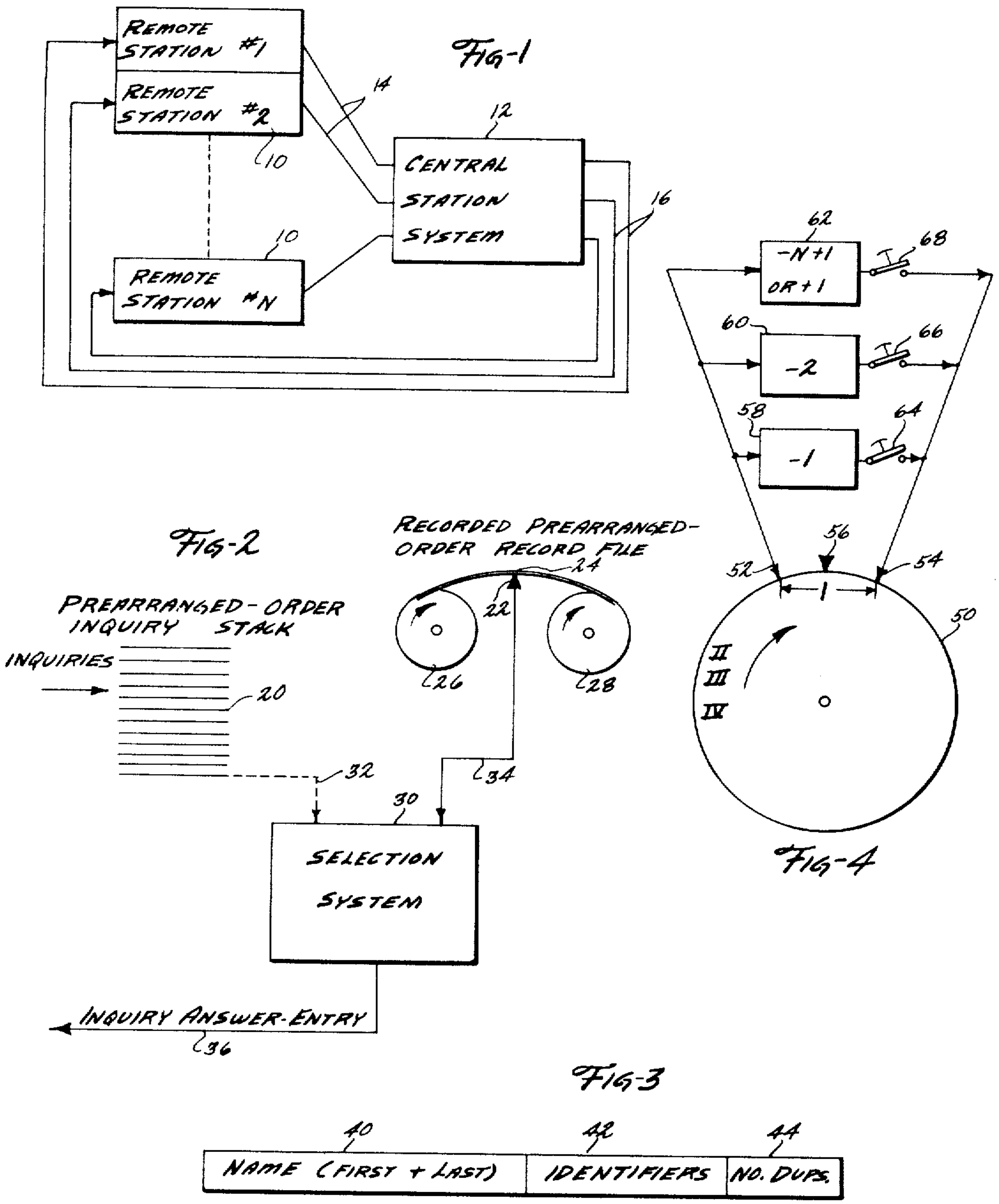
FIGURE 1 is a diagrammatic representation of a system constructed in accordance with the present invention.
FIGURE 2 is a diagrammatic representation illustrating the operation of a system incorporating the present invention.
FIGURE 3 is a diagrammatic representation of the format for inquiries to the system.
FIGURE 4 is a diagrammatic representation illustrative of the manner in which inquiries may be registered in the system of the present invention.

Referring initially to FIGURE 1, a system embodying the invention is functionally illustrated. Blocks representing N remote control stations are represented by reference characters 10. The remote control stations 10 are indicated as connected to a central station 12 over transmission lines 14. At the central station 12 a selected line 14 is connected to receive an inquiry. Thereafter, the inquiry is answered over one of the associated transmission lines 16 which carry information from the central station system back to the remote stations. Of course, in an actual system, the transmission lines 14 and 16 may be identical. Furthermore, each of the lines 14 or 16 may sometimes consist of several conductors and at least one of the conductors may be for the purpose of controlling switching equipment within the central system 12. The switching equipment within the system 12 will not be described in detail herein, it being understood that this equipment per se forms no part of the present invention and is generally well known in the prior art. It is considered sufficient to state that the switching equipment may be of the type commonly employed in telephone switching. Where several conductors in lines 14 and 16 are not desired, a lesser number may be employed on a time-sharing or multi-carrying wave principle, also as well known in the prior art.

In the operation of the system, a vast amount of data is catalogued at the central station system 12 in a predetermined order, e.g. alphabetical. A remote station 10 then sends an inquiry to the central station system over the lines 14 identifying the data desired by providing the identification under which the data is classified. For example, in using the system for an automatic credit agency, the remote station may provide the last and first names of the subject, and any pertinent information relative to his other identification, e.g. middle name, birth year, social security number, state of birth, etc.

The alphabetic files are then searched until the subject's last name is located. Then if the other identification checks, information pertinent his credit is transmitted back to inquiring remote station. In general, pertinent the present invention, is the economical structure for rapidly locating the desired data.

A preliminary consideration of such a method utilized will now be provided with reference to FIGURE 2.

As inquiries are made to the central station system, they are recorded in a memory apparatus which is represented as a stack 20 of individual inquiries. It is to be noted that the bottom entry in the stack is expected to be the first which is processed while the top entry is expected to be the last entry processed. The prearranged order of the entries in the stack 20 coincides with the coming prearranged order (next to be encountered by a magnetic sensing head 22) on a magnetic tape 24. That is, the arrangement of the inquiries in the stack 20 may, for example, be alphabetical with the lowest inquiry in the stack beginning with the letter L. In such instance, the magnetic tape 24 would be positioned so that the letter L (as a basis of classification) is next to be encountered by the sensing head 22.

The magnetic tape 24 is carried on reels 26 and 28 so that as the tape is advanced from the reel 26 to the reel 28, to provide entries recorded on the tape to the sensing head 22 in a prearranged order, the same order is preserved in the inquiry stack 20. As a result, the movement of the tape 24 is somewhat minimized to efficiently answer inquiries provided from the stack 20.

As the entries in the stack 20 are individually processed, they are supplied to a selection system 30 as indicated by the dashed lines 32 along with the identifying data pertinent each entry on the tape 24, which is supplied to the selection system 30 through a line 34. Upon a determination that the entry on the tape 24 coincides to the information sought by the inquiry applied through the communication path 32, the selection system 30 functions to sense the desired information and answer the inquiry over a transmission path 36. Of course, if no entry appears to match that inquiry that fact is manifest.

In the operation of the system schematically illustrated in FIGURE 2, it is to be noted that as new inquiries are made, they must be entered in the prearranged order of the inquiry stack 20. That is, the inquiry stack 20 must be virtually continually undergoing rearrangement so as to keep it in the proper prearranged order coinciding to the prearranged order of data entries next to be encountered on the tape 24.

Of course, the inquiries supplied to the system may take various forms; however, one format useful in a credit agency operation is illustrated in FIGURE 3. The inquiry may of course be variously coded, and normally binary codes would represent intelligence.

The first portion 40 of the code word represents the name (first and last) of the subject under inquiry. Normally, the last name would be provided first and form the basis of classification in an alphabetical order. The second portion 42 of the code word carries further identification or identifiers of the subject. These identifying characteristics are useful in ambiguous name situations. For example, there may be several Joe Smiths; however, none have the same social security number, and may not have the same middle initial, birth year, etc.

In the operation of the system, the subject identified by name is first located, then if the identifiers provided with the inquiry match the identifiers registered as an entry, or if there is no mismatch, a hit is said to have occurred and the detailed information on the subject is provided to the inquiring station.

In some instances the perion making the inquiry may suspect that the identifying information is ambiguous, identifying several persons. As a result, he may wish to specify how many inquires he is willing to accept. In such a case, the last portion 44 of the word format carries a number which indicates the number of duplicate inquiries, the inquiring station wishes to receive in the tailed to identify the subject seeking credit.

The actual mechanism for providing inquiries to the system may vary widely; however, one system which has been found satisfactory involves a telephone call to the central station wherein the name, identifiers, and duplication number are given telephonically to an operator at the central station, who punches a tabulating card with hope that one of those inquiries may be sufficiently de-that information which card is automatically entered into a card reader. Of course, card punching systems and card reading systems are well known in the prior art and widely used to carry alpha-numeric data.

The information once placed on a tabulating card is then entered into a memory which carries the inquiries in the stack or list format. Of course, various type memory systems may be employed as magnetic core memories or cryogenic memories; however, in the illustrative system of the present invention, the memory employed is a magnetic drum. Therefore, the inquiries are arranged in a list or stack on the magnetic drum, the order of which coincides to the order in which entries are contained on the magnetic tape and are next to be encountered.

The organization of the magnetic drum which carries the list or stack of inquiries provides that it operate in a parallel fashion. That is, a gang of sensing magnetic heads are mounted side by side (logically) to simultaneously sense bits from all the channels across the drum. These bits are transferred through an internal circuit and simultaneously returned to the drum by a gang of record heads which are positioned in a similar arrangement to the transducer heads. In effect, the word carrying the inquiry is written across the drum with one bit registered in each channel of the drum so that the entire inquiry is simultaneously sensed and recorded in a parallel fashion.

In the operation of the memory drum to manipulate the list or stack, it is frequently necessary to shift the inquiries in various directions as well as to preserve the list in precisely the order in which it exists. A general consideration of the structure of the magnetic drum and the manner of accomplishing shifts, will now be made with reference to FIGURE 4.

In FIGURE 4 there is shown a circle 50 representing the flat end of a magnetic drum, e.g. a cylindrical member coated with magnetic material upon which binary information may be recorded and thereafter sensed, during revolution of the cylinder.

At the upper portion of the drum 50 there are placed two sets of magnetic transducer heads. A first set of heads 52 read information from the drum 50 by sensing electrical signals from the magnetic signals on the drum. A set of recording heads 54 are mounted adjacent the drum offset from the set of heads 52 by one bit position, and serve to record electrical signals as magnetic variations back on the drum 50.

As the drum 50 is revolved in a clockwise direction, a row of signal positions containing a code word first pass under the set of heads 52, then a brief interval later the same positions pass under the set of recording heads 54. Mounted between the heads 52 and 54 is an erase magnet 56 which clears the magnetic information from the drum in the space between the heads 52 and 54.

The electrical signals sensed by the set of heads 52 is applied to three separate circuits 58, 60 and 62 which may be selectively connected to the record heads 54. The delay circuit 58 may be considered to have a delay of −1, which time coincides to the time (logically) required for the bit position leaving the set of heads 52 to arrive under the set of heads 54. Associated with the delay circuit 58 is a switch 64 so that upon closure of the switch 64, binary signals are sensed by the set of heads 52, from a particular row of digit positions, applied to the delay circuit 58, through which they pass to arrive at the set of recording heads 54 for recording in precisely the locations from which they were sensed.

During operation of the magnetic-drum memory when the inquiry stack contained thereon is being held stable, the switch 64 is closed while the switches 66 and 68 (associated with the circuits 60 and 62 respectively) are held open. As a result, the information is preserved in position in rows traversing the length of the drum 50.

When it is desired to shift the inquiries in the stack up or down, either to accommodate a new inquiry or to fill the space vacated by an inquiry which has been answered, the switches 66 and 68 must be manipulated to accomplish the desired shifting. Referring to the three numerals II, III, and IV, positioned on the drum 50, consideration of the shifting operation may be described.

As indicated above, during normal operation as the drum revolves in a clockwise direction, the binary word in storage location II would be sensed, delayed for the brief interval required for the location II to pass from the head 52 to 54, and then be rerecorded through the switch 64. If however, it is desired to shift the list back, e.g. record the contents of the location II in the location III, the switch 64 is opened and the switch 66 is closed. Under such conditions, the contents of the location II is sensed along with the contents of the location III so that the contents of the location II emerges from the delay circuit 60 at a time to be recorded in the location III. Thus, the contents of each location is shifted to one-higher numbered location.

To advance the contents recorded in locations on the drum 50, the switches 64 and 66 are opened while the switch 68 is closed. As a result, the path of circuit 62 is activated which may be quite long taking the form of a magnetic drum channel capable of delaying electrical signals for a period very close to the interval required for a storage location to pass from the set of heads 54 around the drum to the set of heads 52, less 1 information location. Or alternatively, the circuit 62 may provide no delay at all and simply comprise a shaping circuit so that information for example sensed from the location III is immediately recorded in the location II thereby advancing the position of inquiries in the stack. Thus it may be seen that the magnetic drum register is capable of containing several independent inquiries, and selectively advancing or retarding inquiries in the list to accommodate manipulation thereof.

Figure 5:
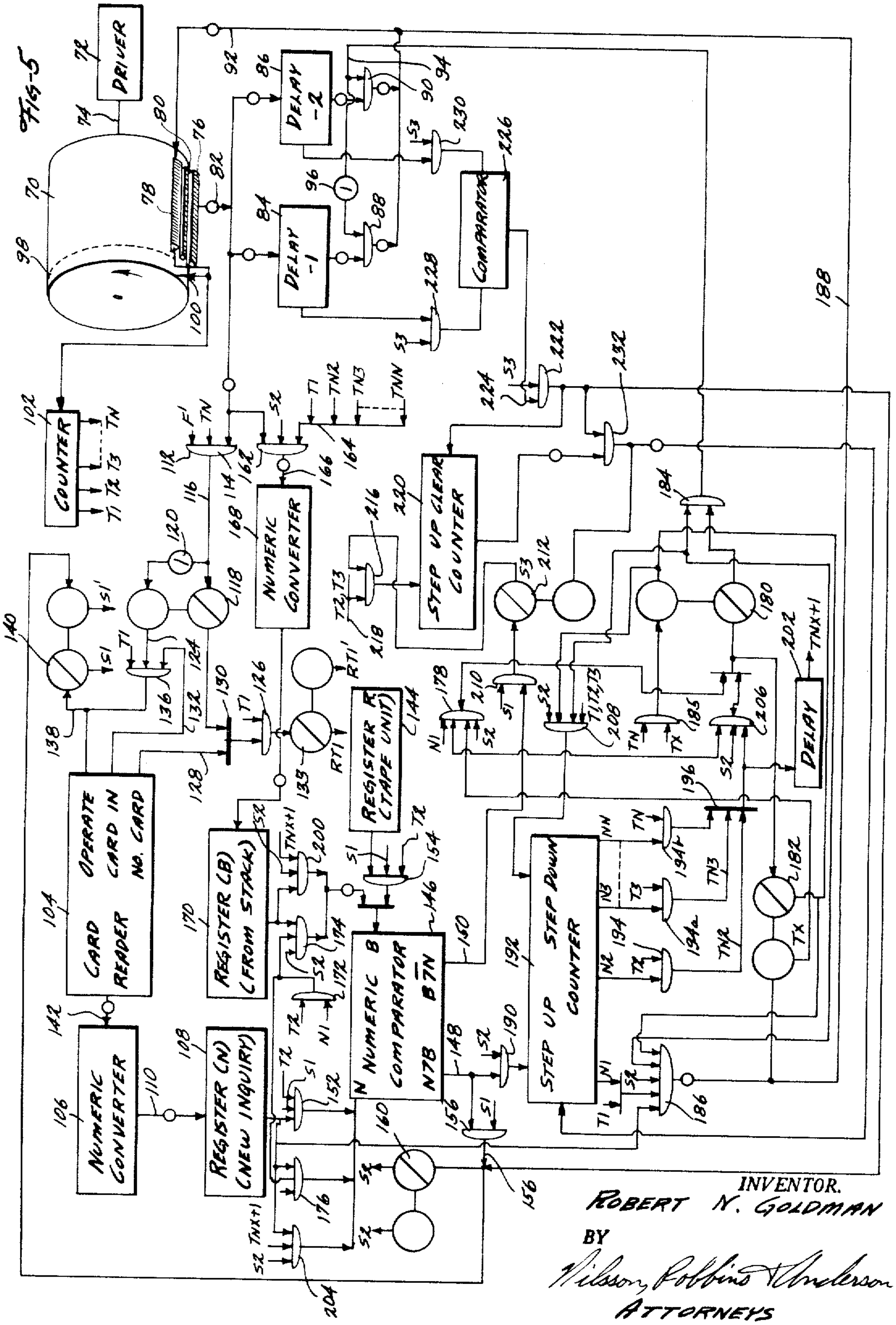
FIGURE 5 is a diagrammatic representation of one portion of a system constructed in accordance with the present invention.

Considering the magnetic drum as a means to accommodate the inquiry stack, reference will now be had to FIGURE 5 for a more-detailed explanation of the total system.

In FIGURE 5 a drum 70 as previously described is revolved as indicated by a driver 72 coupled to the drum by a shaft 74. A row 76 of sensing heads is positioned to logically communicate with one word location on the drum and a row 78 of recording heads is similarly positioned offset from the row 76. An erase-magnet structure 80 is positioned between the rows 78 and 80 as described above.

In the operation of the memory or drum register, an information word is sensed by the heads of row 76, passed through a set of conductors comprising a cable 82, designated by a small circle and a line, which convention is used here throughout to indicate a cable or a set of conductors. The signals in the cable 82 are transferred and applied to a delay circuit 84 and a delay circuit 86. Of course, the circuits 84 and 86 actually comprise a number of individual delay channels coinciding to the number of bits in the information word so that essentially each of these circuits may comprise twenty some individual delay mechanisms.

The delay circuit 84 is connected to a group gate 88 which is a group of "AND" gates that function to pass the high level of a two-state signal, when, and only when, all the inputs thereto are in a high state. Various forms of "AND" circuits are well known in the prior art and will not be disclosed herein; however, it is to be noted that the symbol employed for the group gate 88 is employed throughout to represent an "AND" gate or a group of "AND" gates which operate similarly for a set of parallel signals.

The output from the delay circuit 86 is applied to a group gate 90, the output from the latter gate along with the output from the gate 88 being connected through a cable 92 to the row 78 of recording heads.

Figure 6:
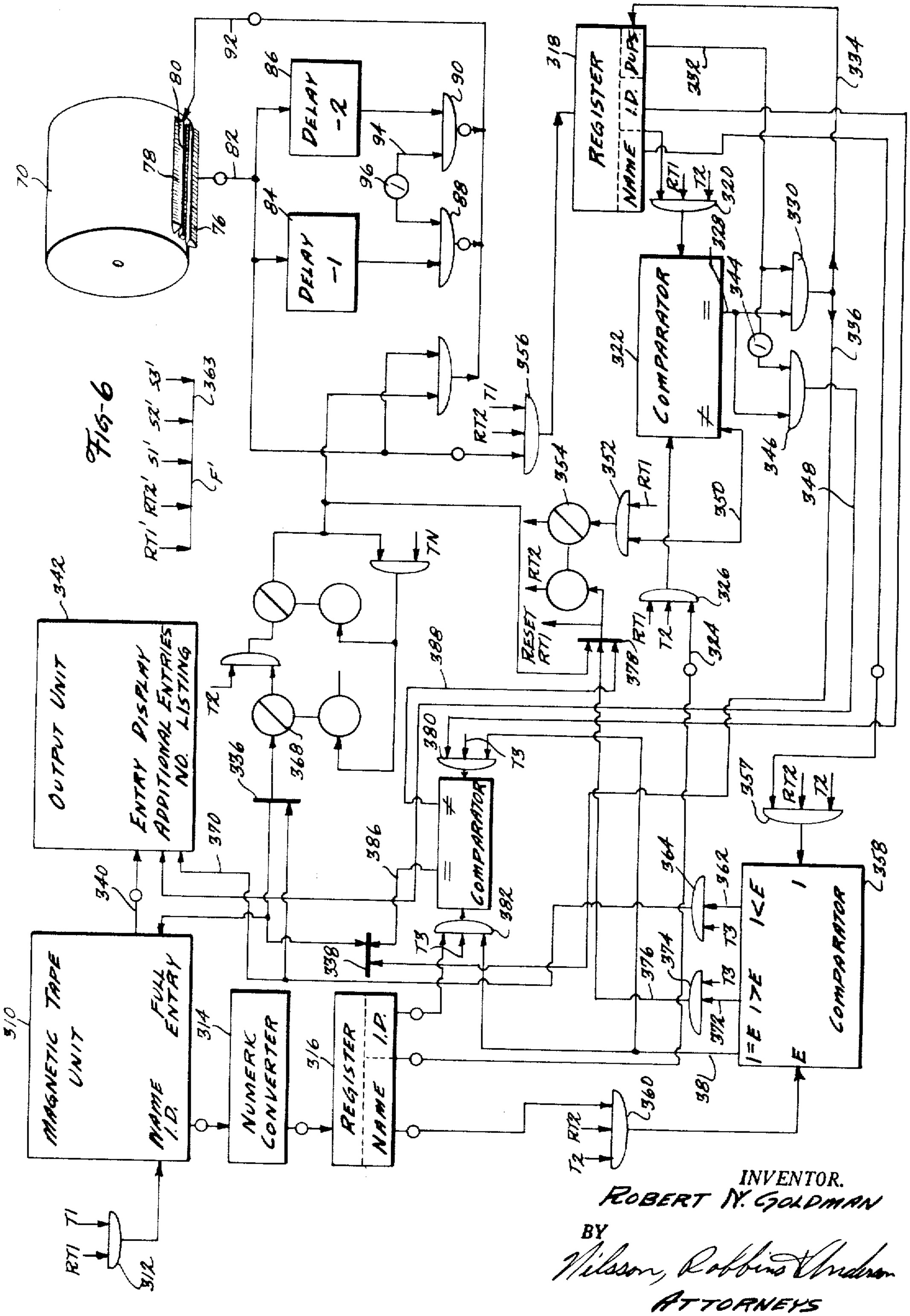
FIGURE 6 is a diagrammatic representation of the other portion of a system constructed in accordance with the present invention.

As indicated above with reference to FIGURE 4, another path is provided for the signals taken from the drum; however, that circuit is shown in FIGURE 6 and will be described hereinafter.

The gate 88 is normally qualified so that signals pass from the row 76 of heads through the cable 82, the delay circuit 84, the gate 88, the cable 92, and back to the row 78 of recording heads to be returned to the location from which they were taken. That mode of operation results in "no-shifting" of the signals. However, upon the occurrence of a high signal in a conductor 94, the gate 90 becomes qualified while the inverted or low form of the signal is applied to disqualify the gate 88 from an inverter circuit 96. It is to be noted that inverter circuits as the circuit 96 are well known in the prior art, and function to provide an output inverted in form from a received two-state signal. For example, if the two-state input signal is high, the output of an inverter as the inverter 96 is low, while conversely if the input to the inverter is low, the output therefrom is high.

In the manipulation of the inquiry stack on the drum 70, upon the occurrence of a high signal in the conductor 94, the gate 88 is disqualified while the gate 90 is qualified with result that code words are delayed by two location spaces in passing through the delay circuit 86 and then returned to the drum 70 via the gate 90, and the row 78 of recording heads to a position delayed one location from the position from which they were taken.

The structure and technique for metering and controlling the data locations or spaces about the drum 70 involves the well known technique of incorporating a clock channel 98. The clock channel 98 contains equally spaced pulses which are sensed by a clock head 100 and provided to the row 78 of transducer heads to control the recording of pulses thereby, and similarly applied to a counter 102.

The counter 102 has a plurality of outputs $T_1$ through $T_N$ which coincide to the number of data word locations about the circular surface of the drum 70 so that as each particular code word location passes under the row 76 of sensing heads, an output is exclusively provided from the counter 102 on one of the output lines $T_1$ through $T_N$ which line is associated with the particular code word location. For example, when the location $T_1$ (comprising a row of digit locations arbitrarily defined across the face of the drum 70) lies under the row 76 of sensing heads, the output from the counter 102 designated $T_1$ is exclusively high. Subsequently as the following data locations pass under the row 76 of sensing heads, subsequent outputs from the counter 102 becomes high to manifest the position of the drum 70.

In view of the above preliminary introduction of the list-manipulation facility of the system, the explanation of the operation thereof may now best be advanced by assuming various stages of operation and introducing components of the system as they are functionally described.

Assume initially that an inquiry is made on a person who is identified by name and identifiers contained on a tabulating card which has been placed in a card reader 104. On command, the card reader senses the information from the card and applies it through a numeric converter 106 to a register 108. Card reading mechanisms sufficient for the function of the reader 104 are very well known and widely used. The numeric converter 106 functions to convert the signals sensed from the card into purely numerical form, e.g. binary form, for containment in the register 108. Numeric converters of the type satisfactory for use as the converter 106 are well known in the prior art and are sometimes integrally built in a single unit with a card reader as the reader 106. It is to be noted that the reader 104, the converter 106, and the register 108 are interconnected by cables which provide one conductor for each parallel digit. Therefore, for example, the cable 110 connecting the converter 106 to the register 108 provides one conductor for each binary signal of the inquiry, just as the register 108 provides one stage for each such binary signal.

Preliminary to this transfer of information, the system must determine which operation shall be performed first: (1) read a card and place the information therefrom in the stack on the drum 70; or (2) select an inquiry from the stack recorded on the drum 70 and locate the entry recorded on magnetic tape which is identified by the inquiry, then manifest the entry to inquirer. The structure for making this determination will now be considered.

A principal consideration in determining whether or not a fresh tabulating card should be sensed and the inquiry therefrom placed in a stack is whether or not the present stack completely fills the drum 70. If the drum is full, the register thereon designated $T_N$ (top of stack) contains an inquiry. Therefore, whether or not the stack is full may be determined by sensing whether or not the register designated at the time interval $T_N$ contains an inquiry. To accomplish this determination a group gate 112 receives the contents of cable 82 and is qualified during the interval $T_N$ through a conductor 114. The group gate 112 further requires qualification by a signal designated F' which is a composite signal indicating that the system is not in process of entering an inquiry or sensing an entry. That is, the signal F' the formation of which is considered in detail below, is high at a time when the system is in a quiescent state.

Qualification of the group gate 112 passes a signal to a conductor 116 which is the combined output from the gate. That is, in the event that any of the input conductors to the group gate 112 carries a high signal (indicating an inquiry in the register $T_N$ at the top of the list), an output (high signal) occurs in the conductor 116 and is applied directly to a flip-flop circuit 118 and indirectly through an inverter 120.

Flip-flop circuits clocked for operation by drum clock pulses and satisfactory for use as the circuit 118 are well known in the prior art and in general are capable of two stable states depending upon the last input received. The symbol employed for the circuit 118 is used herethroughout to indicate a flip-flop circuit, and incorporates two circles, one of which contains a diagonal line. A pulse applied to either of the two circles will cause the output from that circle to remain high while the output from the other circle goes low. The output from the circle bearing the diagonal, designating the "set state" when high, is indicated as a particular signal while the output from the circle without the diagonal line is indicated as the prime or negation of that signal.

The occurrence of an inquiry at the top of the stack of inquiries registered on the drum 70 in position $T_N$, results in a high signal in the conductor 116 thereby setting the flip-flop circuit 118 and causing the output to a conductor 122 to become high and the output to a conductor 124 to become low. Summarizing then, the high signal in the conductor 122 indicates the stack is full while a high signal on the conductor 124 indicates the stack is not full.

If the stack is full, or if there is no card in the card reader 104, it is evident that inquiries in the stack should be processed. The system accomplishes that command through an "AND" gate 126 which is qualified either by the conductor 122 or a conductor 128 both of which are connected through and "OR" gate 130 to the "AND" gate 126. The structure of "OR" gates is well known in the prior art to functionally couple separate two-state input signals independently to a single output.

The conductor 128 is connected from the card reader 104 and provides a high signal when no card is in the reader. This output is often provided from standard and conventional card readers, along with the negation of the signal which appears high in a conductor 132 to indicate that a card is in the reader.

Upon the passage of a high signal through the gate 130, indicating either that no card is contained in the reader or that the list of inquiries is full, at a time designated $T_1$, the gate 126 is qualified to set a flip-flop 133 the output of which is designated $RT_1$ to indicate the first stage of reading tape on the magnetic tape unit. The operation of reading tape to locate a desired inquiry is considered below; however, assume at present that there is a card in the reader bearing a fresh inquiry, and that the stack of inquiries contained on the drum 70 is not full. In such an instance, the conductor 132 from the card reader 104 carries a high signal which is applied to an "AND" gate 136, which gate also receives a high signal through the conductor 124 from the flip-flop 118 indicating there is available space on the drum. Thus, the gate 136 is qualified during the interval $T_1$ to develop a pulse in conductor 138, which pulse is applied to the card reader 104 and to set a flip-flop 140. The pulse applied to the flip-flop 140 sets the flip-flop to provide a signal $S_1$ in a high state, indicating the first stage or stage one of reading a card into the list.

The pulse applied through the conductor 138 to the card reader 104 commands the card reader to operate, thus reading a card and providing parallel signals through a cable 142, to be converted to numeric form by a converter 106 and thereafter registered through the cable 110 in the register 108.

The fresh inquiry in the register 108 may be variously related to the inquiries in the list on the drum 70, and to the position of the tape relative the prearranged order. Assume for example, that the numerical arrangement (in simplified numerical form) of the inquiry stack is as follows; with alphabetic arrangement converted to numerical decimal significance.

X
X
X
X
"16"
"14"
"12"

Considering the bottom inquiry in the stack as number "12", according to the prearranged order, assume further, that the tape unit is currently at a position to sense (according to the prearranged order) a number "10." Of course, after the number "10" is sensed, the number "11" will be sensed, and so on.

In view of the above assumed positions or states of the stack and the tape, it may be noted that different operations must be performed depending upon whether or not the fresh inquiry has numerical significance of: "9" or less; "11," or "13" or more. That is, if the inquiry is "9" or less, the tape unit has just passed the pertinent entry which will not be available for some time. Therefore, the fresh inquiry should be placed high in the list, e.g. at or near the top.

If the fresh inquiry is "11", the pertinent entry on the tape is eminent. Therefore the fresh inquiry should be placed at the bottom of the stack, replacing the inquiry designated "12" with all the inquiries in the stack shifting upward, i.e., retarding.

If the fresh inquiry is "13" or more, the pertinent entry from the tape will soon be sensed (depending upon the magnitude of the number) and the fresh inquiry would be entered near the bottom of the stack in a space resulting from a retarding shift of the upper entries in the stack.

The determination of the proper position in the stack for the fresh inquiry is partially resolved by an initial step of determining whether or not the fresh inquiry is above or below the current entry on the tape, according to the predetermined order. That is, pursuing the above example, the query is whether or not the fresh inquiry is above or below "10."

The last entry sensed from the tape system is contained in a register 144 (near the center of the drawing) as will be described below. However, for the present operation, assuming the contents of the register 144 to be "10," the next function is to compare the magnitude of the contents of the register 144 with the magnitude of the contents of the register 108. This operation is performed by a numeric comparator 146, the structure of which is well known in the prior art, and which receives two sets of digital signals which may be in binary-coded form, and which manifests a pair of opposite outputs, either high or low, in a pair of output conductors to indicate which of the inputs has a higher magnitude. The numeric comparator 146 has an input N and an input B. Two outputs are then possible: $N>B$ or $B>N$. The output $N>B$ (N input is greater than B input) is manifest in a conductor 148 by a high two-state signal while the output $B>N$ is similarly manifest as a high signal in a conductor 150.

The fresh inquiry contained in the register 108 is applied to the N input of the comparator 146 through a group gate 152 at a time during the initial or first stage of entering a fresh inquiry in the stack. The first stage is manifest by the high state of a two-state signal $S_1$ as previously described, and the time $T_2$ is manifest by a pulse from the counter 102. Therefore, at the proper time the fresh inquiry is applied through the gate 152 to the numeric comparator 146, at the N input.

The B input to the comparator 146 is provided from the register 144 (containing the current tape value) through an "AND" gate 154 which is connected to receive an input from the register 144 along with the inputs $S_1$ and $T_2$. In this regard, it is to be noted that the interval $T_1$ of a drum cycle is employed to transfer the contents of the card reader 104 into the register 108. Therefore, during the interval $T_2$, the contents of the registers 108 and 144 are applied to the numeric comparator 146. If the fresh inquiry is higher than the values sensed at the current position of the tape unit, e.g. if the contents of the register 108 is higher than the contents of the register 144 according to the prearranged order, the output of the conductor 148 becomes high to qualify "AND" gate 156 which also receives the high signal $S_1$ indicative of the first stage of operation. Thereupon, the gate 156 provides a high signal through a conductor 158 to set a flip-flop 160 causing a stage-two indicating signal $S_2$ to go high, and resetting the flip-flop 140 causing the stage one signal $S_1$ to go low.

The occurrence of the stage two signal $S_2$ in a high state indicates that the fresh inquiry is higher or more-advanced in the predetermined order than the current entry just sensed from the tape.

Therefore the function of the second stage manifest by the high signal $S_2$ is to locate the position of the fresh inquiry in the stack contained on the drum 70. Pursuing the example above, the second stage of operation manifests the fresh inquiry to be over "10"; therefore, the inquiry could be "11," or "13," for example assume initially that the fresh inquiry is designated "11" and therefore should be placed at the bottom of the stack with all of the entries now registered moving, or retarding to accommodate the fresh entry. This operation is undertaken in the structure of the illustrative embodiment, by first comparing the bottom entry in the stack to determine it is higher than the fresh inquiry.

During the next following cycle of the drum 70, the first portion of which as manifest by the timing signal $T_1$, the contents of the bottom register $T_1$ is applied to a group "AND" gate 162 which is then qualified by high signals $S_2$ and $T_1$, the latter applied through an "OR" gate 164. The bottom inquiry on the list is there applied through the gate 162, a cable 166 and a numeric converter 168 to a register 170. The numeric converter 168 may be of the form previously described, as may the register 170. At this stage of operation, the bottom inquiry on the list is contained in the register 170 while the fresh inquiry is contained in the register 108. The entry of the information in register 108 occurred during the previous cycle of the drum 70, while the insertion of the inquiry in register 170 occurred during the first timing interval $T_1$ of the second cycle.

Upon the occurrence of the second timing interval, $T_2$, an "AND" gate 172 is qualified by the signal $T_2$ and a signal $N_1$ as will be described hereinafter. The signal $N_1$ (when $S_2$ is high) manifests that the system is in the first phase of stage $S_2$.

The qualification of the gate 172 results in the application of a pulse to an "AND" group gate 174 which is qualified by the signal $S_2$ and transfers the contents of the register 170 to the B input of the numeric comparator 146. Simultaneously, the contents of the register 108 is applied to the N input of the comparator 146 through a "AND" gate 176, qualified by an output from the gate 172, and the signal $S_2$ indicating a second stage. Therefore, during the interval $T_2$, the contents of the bottom storage space in the list is compared with the fresh inquiry by the numeric comparator 146. If the fresh inquiry is lower than, or equal to, the bottom list entry a high signal appears in conductor 150 which qualifies an "AND" gate 178 that also receives the signals $N_1$ and $S_2$ indicating an initial phase of the second stage.

The output from the gate 178 is applied to a flip-flop 180 and to a flip-flop 182 the output of which is termed $T_X$. With the flip-flops 180 and 182 both providing high signals to qualify and "AND" gate 184 the output thereof is applied to the gate 90 associated with the drum 70, with the result that the contents of the drum is shifted one position, so that the inquiry in space $T_1$ now skips space $T_2$ as it emerges from the delay circuit 92 during interval $T_3$. Thus, the entire list is shifted in a retarding fashion to render the lowest ordered position ($T_1$) available for the fresh inquiry.

Considering the above example, this situation would occur if the fresh inquiry were value of "11." That is, if the fresh inquiry were "11," the stack as indicated above would be shifted into higher positions and "11" inserted at the bottom of the stack. The operation of inserting such a value "11" will now be considered.

Upon the occurrence of the timing signal $T_N$, after the flip-flops 180 and 182 are set, the flip-flop 180 is reset through an "AND" gate 185 by the signal $T_N$ from the flip-flop 182, and the signal $T_N$, thereby applying a high signal to an "AND" gate, 186. The gate 186 also receives a high signal from the flip-flop 182 which remains set, and the flip-flop 160 manifesting the stage $S_2$. Therefore, the gate 186 is qualified to pass the contents of the register 108 to a cable 188 upon the instance of the timing pulse $T_1$, thereby recording the fresh inquiry in the stack bottom location, completing the phase of operation by resetting the flip-flop 182.

If, on the other hand, the fresh inquiry has a value of say, "13," or some other higher value in the prearranged order, it is necessary to shift only a portion of the inquiries in the stack to accommodate the insertion of the fresh inquiry. Assuming such an instance, the comparison considered above between the stack bottom inquiry and the fresh inquiry would have resulted in a high-value signal appearing in conductor 148 from the comparator 146 rather than from the other output conductor 150. Upon such an occurrence, an "AND" gate 190 is qualified by also receiving the stage-indicating signal $S_2$, and pulses a step counter 192. The counter 192 is essentially a ring counter having a plurality of outputs $N_1$ through $N_N$. Depending upon the state of the counter, one of the outputs is exclusively high while the remainder provides the low value of two-state signals. The output $N_1$ manifests the quiescent state of the counter, which the counter occupies in the initial stage of stage two. However, upon qualification of the gate 190, the counter is advanced to manifest the signal $N_2$ high, so that as the counter steps to the stage $N_2$, a gate 194 is qualified (during the interval $T_2$) the output of which is applied to an "OR" gate 196. The output of the gate 194 is also applied to the "OR" gate 164 (connection not shown) which permits the qualification of that gate during the timing pulse $T_2$ to pass the contents of the drum register 70 manifest during the interval $T_2$ through the numeric converter 168 and into the register 170. Therefore, it may be seen that if the fresh inquiry is found to be higher than the bottom inquiry on the list, the second inquiry is brought out for consideration. Pursuing the example, the second inquiry is transferred from the drum 70 through the gate 162 and the numeric converter 168, during the pulse $T_2$. Thereafter, during the pulse $T_3$, the inquiry is transferred to the numeric comparator through an "AND" gate 200 which is qualified by the stage signal $S_2$ and a developed signal $T_{NX}+1$. Essentially the signal $T_{NX}+1$ manifests a clock interval coinciding to the last of the $T_N$ signals as from gates 194, with an added delay of 1 digit. This signal is generated by a delay circuit 202 connected to receive the output of the "OR" gate 196 and incur a one timing pulse delay therein.

Thus, the output of the register 170 is applied to the numeric comparator 146 during the interval of $T_3$ along with the fresh inquiry which is applied to the comparator through an "AND" gate 204, which is qualified by similar signals as the gate 200.

Of course, if the inquiry taken from the stack is found, still to be lower than the fresh inquiry, the operation is repeated with the third inquiry of the stack brought out for comparison. Thus, the system works through the inquiries of the stack in the prearranged order until a time when the stack inquiry is greater according to the predetermined order than the fresh inquiry. Upon such occurrence, the location for the fresh inquiry in the stack is determined. For example, assume that the fresh inquiry is "13" in the assumed set of values, and that the current value from the stack is "14." In such an instance, the output from the numeric comparator 146 to the conductor 150 becomes high. Thereupon, an "AND" gate 206 is qualified to provide an output pulse which sets both the flip-flop circuits 180 and 182. Upon setting of these flip-flop circuits, the gate 184 is immediately qualified, thereby qualifying the gate 90, and delaying the contents of the drum 70 which follows the value determined to be higher than the fresh inquiry. This shifting stops when the gate 184 is no longer qualified as occurs when the flip-flop 180 is reset through the gate 185.

Therefore, the inquiries in the list beginning with that manifest at the time $T_2$ are all retarded one position leaving the space manifest by the time $T_2$ open for insertion of the fresh inquiry. The timing of this entry is accomplished through an "AND" gate 208 which is qualified by the signals $S_2$, the reset state of the flip-flop 180 and the set state of the flip-flop 182. With such qualification, the gate 208 passes pulses $T_1$ through $T_N$ to step down the counter 192. Upon the occurrence of the pulse $T_1$ the counter 192 is stepped from $N_2$ back to N which operation qualifies the gate 186 to pass the contents of the register 108 into the space manifest by the time $T_2$ on the drum 70.

Thus, the list contained on the drum 70 is again adjusted to make room for a fresh inquiry and the inquiry is entered in the proper position. Of course, the operation would be similar if the counter had counted to a higher value; however, the accomplishment would be the same.

The last possible value that may be considered for the fresh inquiry is that it has a numerical significance less than that of the present position on the magnetic tape. That is, pursuing the example set forth above, assume the fresh inquiry is "9," while the magnetic tape unit is currently sensing a value having a significance of "10." In such an instance, the magnetic tape unit will work through many higher-valued entries before returning to scan the lower-value entries. Therefore, for reasons of time economy, it is important for the system to avoid considering the higher-valued inquiries in the stack before searching for the position of the fresh inquiry, designated "9."

Assuming the occurrence of a fresh inquiry of significant equivalence "9," while the tape unit is at value "10" (contained in the register 144) during the initial phase of operation, as previously discussed, the fresh inquiry ("9") would be in the register 108 while the current position of the tape unit ("10") would be manifest by the register 144. As previously indicated, the system during the comparison is in a stage of operation designated by the signal $S_1$. Therefore, the contents of the register 108 is compared with the contents of the register 144 during a time $T_2$, and contrary to the prior assumption, assume at this time that the output of the numeric comparator provides a high signal in the conductor 150 indicating the contents of the register 108 to be less than the contents of the register 144. In such instance, an "AND" gate 210 is qualified to set a flip-flop 212 which manifests as a high state, the signal $S_3$ indicating stage 3 of the inquiry handling operation.

Upon the signal $S_3$ going high, an "AND" gate 216 is qualified and passes the pulses $T_2$, $T_3$, . . ., through an "OR" gate 218. The pulses emerging from the "AND" gate 216 are applied to a stepping counter 220 to advance the count of the counter from zero. The counter 220 is similar to the step counter 192 and counts until an "AND" gate 222 is qualified. The "AND" gate 222 is qualified by the signal $S_3$, and also receives the signal carried in a conductor 224 which is connected to a comparator 226. The comparator 226 receives inputs through signal $S_3$-qualified "AND" gates 228 and 230 which are taken from the delay circuits 84 and 86 and indicate the values of adjacent inquiries as the list is scanned. So long as the values of the inquiries increase or remain equal, the comparator 226 provides a low signal in conductor 224. However, immediately upon sensing a decrease in the values of the inquiries in the sequence, it is recognized that the low values have been reached and therefore a pulse is provided to the gate 222 which in turn qualifies a group "AND" gate 232, resets the counter 220 and resets the flip-flop 212 and sets the flip-flop 160. The group gate 232 applies the contents of the counter 220 into the counter 192 as the flip-flop changes set the system in the second stage of operation indicated by the signal $S_2$, and with the counter 192 containing a number coinciding to the number of timing pulses T, between the contents of $T_1$ and the highest value registered. Therefore, the contents of the counter 192 may now be stepped as the low-valued numbers in the list are worked through to arrive at the proper position for the fresh inquiry value assumed e.g. "9."

In view of the above consideration of FIGURE 5, it is evident that the system is capable of determining the time when fresh inquiries should be entered in the list and entering them in proper order. Of course, it is readily apparent, that other forms of storage may replace the drum containing the list and furthermore, the drum or similar memory may simply contain the addresses of the actual inquiries which are registered elsewhere in a larger memory. Of course, various other schemes are similarly apparent; however, in general, the function of the system to receive inquiries and maintain them in a predetermined order in a list is significant to the present invention.

In addition to receiving and orderly-arranging inquiries, the system of the present invention functions to select entries identified by inquiries and manifest them to the inquiring person. That is, as indicated above, the system of FIGURE 5 during the completion of each operation (entering an inquiry in the stack, or locating and manifesting an entry) makes a determination of what the next operation shall be. This determination is made by considering the cards in the reader, the contents of the stack as explained above. Also as indicated above, with reference to FIGURE 5, the flip-flop 133 is set to provide a signal $RT_1$ high when the system is to read tape and search for the entry identified by the bottom inquiry. Assuming the high state of the signal $RT_1$, as manifest by the flip-flop 132 in FIGURE 5, FIGURE 6 will be considered to describe the manner in which a tape entry is located and manifest.

Referring to FIGURE 6, components which have previously been identified and discussed, bear similar reference numerals to those assigned the same symbol in FIGURE 5. It is to be noted that several of the components shown to be individual in the system presented in FIGURES 5 and 6, may be replaced by a single unit which is energized to perform a plurality of functions on a time-sharing basis. However, for purposes of illustrating and explaining the present invention, the complexities of such time-sharing arrangements have been avoided.

In FIGURE 6, there is shown a magnetic tape unit 310 which incorporates a voluminous record of entries contained on magnetic tape, in accordance with a predetermined arrangement, e.g. alphabetical coinciding to a coded numerical sequence. That is, each entry on the tape is addressed by the subject's name, with the subjects arranged in alphabetical order. When the unit senses a name, it stops to await orders either to advance to the next name (address) or sense the information following the name.

The magnetic tape unit 310 also includes transducers (not shown) for sensing the entries on the tape and converting them to electrical signals, and further includes a control system. Of course, magnetic tape units capable of fulfilling the functions set forth for the unit 310 are well known in the prior art.

Upon the occurrence of the signal $RT_1$ in a high state, at the time interval $T_1$, an "AND" gate 312 (upper left) is qualified to apply a control pulse to the magnetic tape unit 310. Thereupon, the tape unit senses the name and identifiers of an entry on the tape and applies the representative signals through a numeric converter 314 to an entry register 316. It is to be noted that the entry register 316 now contains the name of a subject and his pertinent identifiers, i.e. sections 40 and 42 of the code word format as shown in FIGURE 3. Therefore, the address or identification for the tape entry is contained in the register 316 and the next concern of the system is to determine whether or not that particular entry is desired to be manifest.

Before taking the bottom word or inquiry from the list contained on the drum 70, a check is first made to determine if the last word inquiry identifies the freshly-sensed tape address. That is, for example, it may be that several persons listed as separate entries in the magnetic tape unit are identified by an incomplete inquiry. Therefore, a number of these entries are manifest to the inquiring party, unless the inquiry has specified a limited number of entries to be provided and that number is exceeded.

During the prior cycle of operation, the bottom inquiry on the list was registered in a register 318 as will be described in the description of the final phase of the current cycle. The name and identifier portions of the entry word are applied from the register 316 through a group "AND" gate 320 to a comparator 322 which also receives the similar format portion of the inquiry word contained in the register 318 through a group "AND" gate 326, qualified by the signals $RT_1$ (indicating the first phase of the tape reading operation) and the timing signal $T_2$. Therefore, upon the coincidence of these signals, the comparator compares the last inquiry taken from the list with the freshly-sensed tape entry address. Upon the occurrence of a coincidence in these two sets of signals, an output pulse appears in a conductor 328 which qualifies an "AND" gate 330 to pass a signal providing the gate also receives a signal in a conductor 332. The conductor 332 is connected to a portion of the register 318 which registers the number of duplicate inquiries requested. That is, the inquiry specifies the number of entries that will be accepted which are ambiguously identified by the inquiry. Upon each inquiry being identified, the gate 330 supplies a pulse through a conductor 334 which counts down the content of portion of the register is not reduced to a zero count, the gate 330 applies a pulse through a conductor 336 and an "OR" gate 338 to a command input of the tape unit 310. Upon the occurrence of a pulse at the command input the read out stage is ended as the magnetic tape unit 310 supplies the full details of the entry through a cable 340 to an output unit 342. Thereupon, the output unit displays the full entry to the inquiring person. One form of the output unit may comprise a small telegraphic printer as manufactured by the Mite Corporation of Paramus, N.J., which is capable of receiving digital signals as from a magnetic tape unit to provide a printed output.

In using the system of the present invention for a credit system, the output would normally include such information as arrests and convictions of the subject, bankruptcies and similarly other data of record pertinent his risk on extending credit.

If the newly-sensed entry address is indentified by the last inquiry but the number of duplications acceptable has been exceeded, the low signal carried in the conductor 332 is inverted by an inverter 344 to qualify an "AND" gate 346 which results in the application of a signal through a conductor 348 to a display device on the output unit as an electrical light, which is energized to indicate that additional entries on the tape are identified by the inquiry; however, they have not been requested.

Of course, normally, the inquiry will be sufficiently accurate to identify only one address for an entry on the tape. In such case, the output from the comparator 322 will be to a conductor 350 manifesting lack of coincidence for the last inquiry and dismissing that inquiry as fulfilled. The high signal in the conductor 350 is applied to an "AND" gate 352 which is qualified by the stage-indicating signal $RT_1$ so that a pulse is passed through the gate to set a flip-flop 354 which manifests a signal $RT_2$, indicating phase two of the reading of the read tape operation.

Upon the occurrence of the $RT_2$ high, and at the time of $T_1$, a group "AND" gate 356 passes the bottom inquiry from the list on the drum 70 to replace the former contents of the register 318. Thereafter, at the time of pulse $T_2$, the name portion of the code word registered in the register 318 is applied through an "AND" gate 357 to a comparator 358. The comparator also receives the name portion of the entry address from the register 316 through the "AND" gate 360 during the same interval. Thus, an address identification is compared in part with an inquiry identification. If the identifications match, a hit is said to have occurred and the particular identifiers of the subject are checked for a lack of conflict. However, if the two name codes do not match, it is apparent that either the entry desired is not catalogued or has not been reached. If the entry is not catalogued, the fact will be manifest by the entry being lower in numerical significance that that of the inquiry. In such an event, a pulse is received on a conductor 362 which is passed through an "AND" gate 364 during the time of $T_3$, to be applied to an "OR" gate 366, and set a flip-flop 368. The setting of the flip-flop 368 is an initial operation in shifting the list down to fill the space occupied by the bottom inquiry that has been removed.

The signal from the gate 346 is also applied through a conductor 370 to the output unit to energize a signal, indicating that no listing or entry is carried for the subject sought.

If the magnetic tape unit has not yet reached the address of the inquiry sought, such a fact is indicated by the inquiry being higher than the entry, resulting in a high signal in a conductor 372 to qualify a gate 374 during the interval $T_3$ and resulting in the application of a signal through a conductor 376 and an "OR" gate 378 to reset the flip-flop 354, returning the entire system to the quiescent state so that if the following operation is to be "read magnetic tape," the next address carried on the magnetic tape will be entered for comparison.

The instance of identity between the name portion of the address and the name portion of the inquiry results in a high signal in a conductor 380 from the comparator 358 which signal is applied to qualify a pair of "AND" gates 380 and 382 which also receives a timing signal pulse $T_3$ and the identifier portions of the address from the register 316 and the identifier portion of the inquiry from the register 318 respectively. Therefore, during the interval $T_3$, the identifiers are compared not for coincidence, but for lack of conflict. If there is no conflict, the identifiers are said to be equal and a signal is applied to a conductor 386 which is in turn supplied through the "OR" gate 338 to cause a full entry from the magnetic tape unit to be supplied to the output unit.

It is to be noted that regardless of the manner in which the "read tape" phase is concluded, the last inquiry from the list remains in the register 318, preparatory the following "read tape" phase. It is also to be noted that each of the stages of operation reset the flip-flop defining that stage or phase. Therefore, it is desirable to manifest a quiescent state, when a new stage may be undertaken. This state is manifest by a signal F′ being high as previously assumed. In effect, the signal F′ is developed by an "OR" gate 363 which receives inputs $RT_1'$, $RT_2'$, $S_1'$, $S_2'$, and $S_3'$ from the designated flip-flops, manifesting no other stages in progress.

If the result of comparing the identifiers present a conflict, a high signal appears in a conductor 388 thereby resetting the flip-flop 354 through the gate 378 to return the system to the quiescent state.

From a consideration of the above, it may be seen that the system of the present invention maintains a list of inquiries in accordance with a predetermined arrangement or order coinciding to a predetermined arrangement or order in which entries are catalogued in a voluminous serial memory, e.g. magnetic tape unit. Then, by selectively advancing the list and the serial memory, considerable economy of time results in locating entries from the catalogued system. That is, the greatest possible time required to reach any catalogue entry is the time required to move through the catalogue memory once. On the other hand, many entries will be located much more expeditiously with the result that considerable economy in time provides the system practical for use in various application of data retrieval.

It should be noted that the particular embodiment of the invention described is fully capable of providing the advantages and achieving the objects set forth, such embodiment is merely illustrative and this invention is not limited to the details of construction illustrated and described herein except as defined by the appended claims.

What is claimed is:

1. A filing system for providing entries therein in response to random inquiries, the random inquiries including address data, the filed entries including address data and information data, comprising:

filing record means, including a serial medium recording a plurality of individual filed entries arranged in a predetermined order of increasing sequence, from low to high, of the address data of said plurality of individual entries, and further including means to sense address signals representative of the address data for each instant entry from said medium in said predetermined order of sequence;

an inquiry memory system for containing a plurality of signals representative of a plurality of said inquiries;

means for providing inquiry signals representative of said inquiries and including address signals;

means for indexing said inquiry signals into said memory system in accordance with the address signals thereof, in said predetermined order;

means for testing said address signals representing an instant entry from said filing record means against the lowest address signals in said memory system which are above the address signals of said instant entry in said predetermined order, to provide a coincidence signal upon determining similarity; and means for manifesting said instant entry upon occurrence of said coincidence signal.

2. A filing system according to claim 1, wherein said inquiry memory system includes an output register for containing the certain lowest order address signals therein, which are above the address of said instant entry; and means for translating inquiry signals within said memory system to repeatedly place said certain signals in said output register as inquiries to said filing system are processed.

3. A filing system according to claim 2 further including: means for providing a duplicate signal for an inquiry to limit the number of responsive entries provided; a duplicate signal register for tallying entries manifest in response to a single inquiry; and means for rejecting said inquiry upon the duplicate signal register attaining said duplicate signal.

4. A filing system according to claim 2 wherein said inquiry memory system comprises a cyclic memory comprising a plurality of recurring registers and means for designating one of said recurring registers as said output register.

5. A filing system according to claim 4 wherein said inquiry memory system includes means for shifting a predetermined group of registered inquiries, in said predetermined sequence from one set of said registers to another set of said registers preserving said predetermined sequence.

6. A filing system according to claim 5 further including control means for suspending operation of said means for indexing said inquiry signals upon the registers of said inquiry memory system each containing an inquiry.

References Cited

UNITED STATES PATENTS

| | | | |
|---|---|---|---|
| 2,785,388 | 3/1957 | McWhirter et al. | 340—172.5 X |
| 2,911,624 | 11/1959 | Booth et al. | 340—172.5 |
| 2,994,066 | 7/1961 | Mendelson et al. | 340—172.5 |
| 2,996,699 | 8/1961 | Kramskoy | 340—172.5 |
| 3,075,178 | 1/1963 | James | 340—172.5 |
| 3,107,343 | 10/1963 | Poole | 340—172.5 |
| 3,197,742 | 7/1965 | Rettig et al. | 340—172.5 |
| 3,281,788 | 10/1966 | Hernan et al. | 340—152 |

ROBERT C. BAILEY, *Primary Examiner.*

PAUL J. HENON, *Examiner.*